United States Patent
Fang

(10) Patent No.: US 10,067,789 B2
(45) Date of Patent: Sep. 4, 2018

(54) METHOD AND APPARATUS FOR SCHEDULING CONCURRENT TASK AMONG SERVICE SERVERS BY USING PROCESSING THREAD

(71) Applicant: Tencent Technology (Shenzhen) Company Limited, Shenzhen, Guangdong (CN)

(72) Inventor: Xuewei Fang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 100 days.

(21) Appl. No.: 15/204,424

(22) Filed: Jul. 7, 2016

(65) Prior Publication Data

US 2016/0321104 A1    Nov. 3, 2016

Related U.S. Application Data

(63) Continuation of application No. PCT/CN2015/075594, filed on Mar. 31, 2015.

(30) Foreign Application Priority Data

Apr. 3, 2014   (CN) .......................... 2014 1 0134173

(51) Int. Cl.
*G06F 9/46* (2006.01)
*G06F 15/173* (2006.01)
*G06F 15/16* (2006.01)
*H04L 12/28* (2006.01)
*G06F 9/48* (2006.01)
*G06F 9/50* (2006.01)

(52) U.S. Cl.
CPC ............ *G06F 9/4881* (2013.01); *G06F 9/505* (2013.01); *G06F 9/5083* (2013.01); *G06F 2209/5018* (2013.01)

(58) Field of Classification Search
None
See application file for complete search history.

(56) References Cited

U.S. PATENT DOCUMENTS

2005/0198200 A1\* 9/2005 Subramanian .......... H04L 41/50
709/218
2007/0263650 A1\* 11/2007 Subramania ............ H04L 47/10
370/412

FOREIGN PATENT DOCUMENTS

| CN | 101741850 | 6/2010 |
|---|---|---|
| CN | 103516536 | 1/2014 |
| CN | 104133724 | 11/2014 |
| WO | WO2015/149693 A1 | 8/2015 |

OTHER PUBLICATIONS

International Search Report and Written Opinion received in PCT Application No. PCT/CN2015/075594 dated Jul. 2, 2015.

\* cited by examiner

*Primary Examiner* — Bing Zhao
(74) *Attorney, Agent, or Firm* — Brinks Gilson & Lione

(57) ABSTRACT

A method for scheduling a concurrent task includes: receiving an uploaded service request, and encapsulating the service request into a task object; acquiring a processing thread, and allocating the task object to the processing thread, so that the processing thread selects a service server and sends the task object to the selected service server for processing; and receiving, by using the processing thread, a processing result returned by the service server, generating a response according to the processing result, and returning the response.

8 Claims, 4 Drawing Sheets

US 10,067,789 B2

METHOD AND APPARATUS FOR SCHEDULING CONCURRENT TASK AMONG SERVICE SERVERS BY USING PROCESSING THREAD

CROSS-REFERENCE TO RELATED APPLICATIONS

This application is a continuation of International Application No. PCT/CN2015/075594, filed on Mar. 31, 2015, which claims priority to Chinese Patent Application No. 201410134173.2, filed on Apr. 3, 2014, both of which are incorporated herein by reference in their entireties.

FIELD OF THE TECHNOLOGY

The present disclosure relates to the field of computer technologies, and in particular, to a method and an apparatus for scheduling a concurrent task.

BACKGROUND OF THE DISCLOSURE

When processing a concurrent task, an application server in the conventional technology usually performs parallel processing on multiple service requests by using a multi-process mode, each process independently executes a corresponding processing task, and a response is generated from a processing result and is returned to a corresponding client.

However, under a highly concurrent environment, a service server needs to be added according to a service requirement. If the multi-process mode is used, when a service server is added or deleted, a protocol for interprocess communication needs to be configured according to a service requirement, which results in high maintenance overheads.

SUMMARY

An exemplary method for scheduling a concurrent task includes:
receiving an uploaded service request, and encapsulating the service request into a task object;
acquiring a processing thread, and allocating the task object to the processing thread, so that the processing thread selects a service server and sends the task object to the selected service server for processing; and
receiving, by using the processing thread, a processing result returned by the service server, generating a response according to the processing result, and returning the response.

Moreover, it is also necessary to provide an apparatus for scheduling a concurrent task that can reduce maintenance overheads.

An exemplary apparatus for scheduling a concurrent task includes:
a request receiving module, configured to receive an uploaded service request, and encapsulate the service request into a task object;
a task allocation module, configured to acquire a processing thread, and allocate the task object to the processing thread, so that the processing thread selects a service server and sends the task object to the selected service server for processing; and
a response generation module, configured to receive, by using the processing thread, a processing result returned by the service server, generate a response according to the processing result, and return the response.

An exemplary method for scheduling a concurrent task includes:
receiving, by an ingress node, a service request uploaded by a client, encapsulating the service request into a task object, acquiring a processing thread, and allocating the task object to the processing thread, so that the processing thread selects a service node and sends the task object to the selected service node;
generating, by the service node by performing read and write operations on a data node corresponding to the service node, a processing result corresponding to the task object, and returning the processing result to the ingress node; and
receiving, by the ingress node by using the processing thread, the processing result returned by the service server, generating a response according to the processing result, and returning the response.

DESCRIPTION OF EMBODIMENTS

To make objectives, technical solutions and advantages of the present disclosure clearer and more understandable, the present disclosure is further described in detail below with reference to the accompanying drawings and embodiments. It should be understood that the specific embodiments described herein are only used for illustrating the present disclosure, instead of limiting the present disclosure.

Unless the context clearly indicates otherwise, singular elements or components in the present disclosure may be in the plural and vice versa, which is not limited in the present disclosure. Although steps in the present disclosure are labeled with numbers, such numbers are not intended to limit the order of these steps. Unless the order of steps is explicitly stated or it is explicitly stated that a step needs to be performed on the basis of another step, the relative order of steps can be adjusted. It should be understood that as used herein, the term "and/or" involves and includes any and all combinations of one or more of the associated listed items.

A method for scheduling a concurrent task is provided, where the method may rely on a computer program, and can run on a computer system based on a von Neumann architecture. The computer system may be a web server, a mobile Internet application server, a game portal server, or the like.

Figure 1:
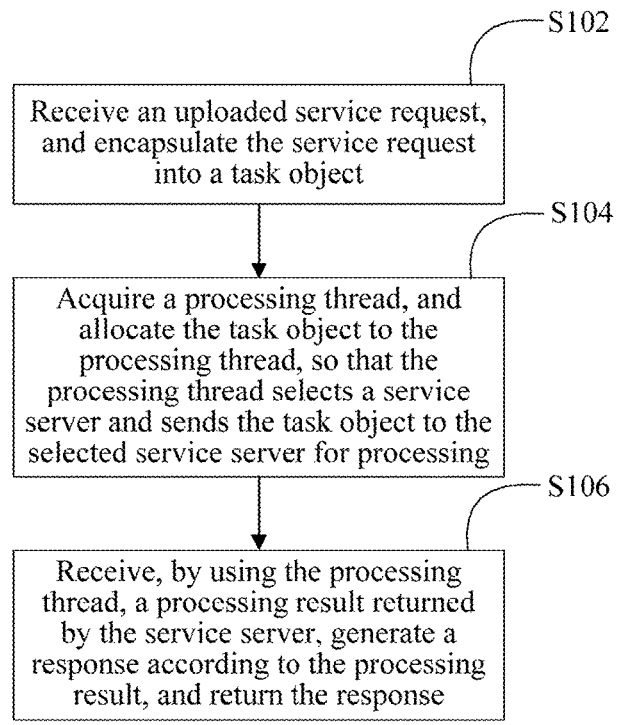
FIG. 1 is a flowchart of a method for scheduling a concurrent task in an embodiment.

In this embodiment, as shown in FIG. 1, the method includes:

Step S102: Receive an uploaded service request, and encapsulate the service request into a task object.

The service request is a service request, of expecting to obtain a data service, initiated by a client to a PN node.

For example, in a web-based video on demand system, a service request initiated by a user is a web access request based on a http protocol, and the web access request includes parameter information such as a user identifier of the user, a video identifier of an on-demand video, and a video address.

For another example, in a mobile phone game system, a service request initiated by a user is a service request that is initiated by using a client for a mobile phone game and related to a game service based on an application protocol of the mobile phone game, for example, during the game, when the user selects to enter a scenario for playing the game, a scenario handover request is initiated to a PN node by using the mobile phone game client.

In this embodiment, parameter information in the service request may be extracted, and then the parameter information is encapsulated into the task object (which may also be a set, an array, or a structure in some programming languages). Further, the task object that is obtained through encapsulation may be buffered in a preset task queue according to a sequence in which the service request is received.

For example, in an application scenario based on a web application server, a request queue and a task queue may exist, where the request queue may be based on a web container (that is, a web application framework), and a httprequest object is stored in the queue. Therefore, the httprequest object may be extracted from the request queue according to a first-in-first-out sequence, some attribute values in the httprequest object are extracted, the httprequest object is encapsulated into a task object in sequence according to the extracted attribute values, and after encapsulation for the task object finishes, the task object may be added to the tail of the task queue (the task object can only be inserted at the tail of the queue and taken out from the head).

That is, after receiving a service request, the web container at the bottom first encapsulates the service request into a request object, and buffers the request object in the request queue of the web application framework according to a sequence in which the service request is received. A computer program running the method may directly extract a request object in the request queue, and encapsulates the request object into a task object.

Task objects are buffered in a form of a queue, which can ensure that a service request arriving first can be preferentially processed (however, it cannot be ensured that a response is preferentially obtained, because when asynchronous and concurrent processing is performed on multiple task objects, it cannot be ensured that processing of a task object that is processed first finishes first). In addition, an upper length limit of the task queue may be set. If a quantity of task objects in the task queue reaches the upper length limit, a response indicating that a server is busy may be directly returned for a received service request, or a prompt indicating queuing information, that is, a quantity of service requests currently waiting to be processed, may be provided according to a quantity of request objects in the request queue.

Step S104. Acquire a processing thread, and allocate the task object to the processing thread, so that the processing thread selects a service server and sends the task object to the selected service server for processing.

Figure 2:
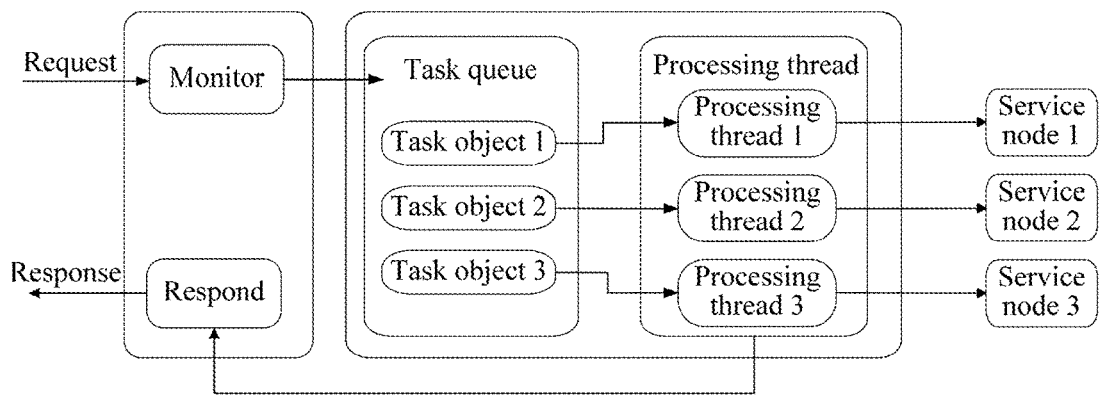
FIG. 2 is a schematic diagram of a principle of performing task scheduling by using a multi-process mode in an embodiment.

In this embodiment, as shown in FIG. 2, multiple processing threads may be set, and after the processing threads are started, task objects are automatically extracted from the task queue in a first-in-first-out mode (that is, extraction starts at the head of the task queue). In another embodiment, a thread pool may also be preset, and each time a task object is obtained through encapsulation, a processing thread is acquired from the thread pool, to allocate the task object to the processing thread for processing.

Figure 3:
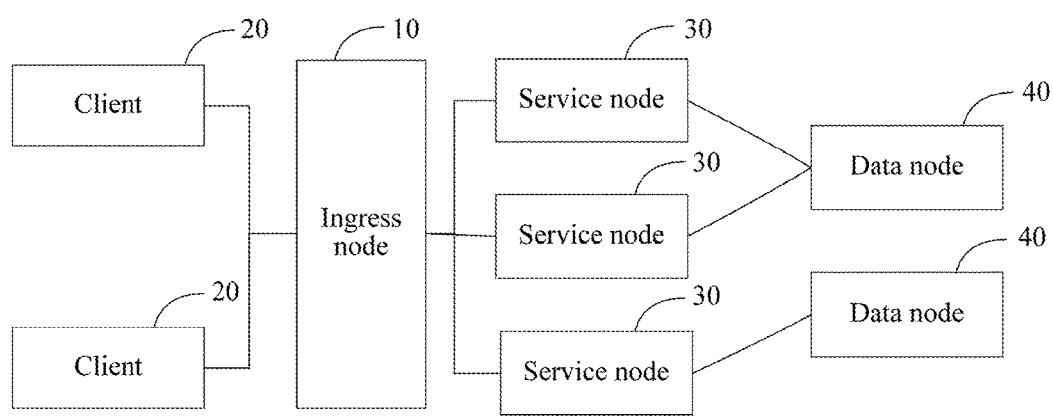
FIG. 3 is a schematic structural diagram of a system for scheduling a concurrent task in an embodiment.

Generally, there are multiple service servers. As shown in FIG. 3, an ingress node 10 running the method is connected to multiple service nodes 30, and each service node is also connected to a data node 40 related to a service type, and may include multiple service servers. The ingress node may store a service node state table, acquire running state information (for example, information such as a bandwidth, a CPU occupancy rate and a memory occupancy rate) of the service nodes by periodically exchanging probing packets with the service nodes, and maintain the service node state table according to the running state information. When selecting the service server, the processing thread may select a service node with low load according to the service node state table, and then send the task object to the service node. Each to-be-processed object may establish a socket connection to the service node, and has an independent port.

As shown in FIG. 2, the service node is connected to a data server, and there may be multiple data servers. For example, in an application scenario, a large-scale application system needs to use multiple databases, where each database has a large amount of data; therefore, these databases can be separately run on each data server. When processing the task object, the service node may perform, by using a data interface provided by the data server, read and write operations on data needed and generated for processing the task object. After the processing finishes, a processing result may be sent to the ingress node by using the foregoing socket connection. The ingress node may forward, according to the port, the received processing result to the corresponding processing thread.

It should be noted that, the ingress node in FIG. 3 may also be an independent web server, an independent mobile Internet application server, or an independent game portal server, or may also include a task distribution server added on the basis of a portal server such as the existing web server, the mobile Internet application server, or the game portal server. The portal server may correspond to multiple task distribution servers. If the task queue has a short length due to a limit of a memory size of a single task distribution server, multiple task distribution servers may be set, so as to increase the upper length limit of the task queue, and a corresponding service server is added at the rear of the task distribution server, so as to reduce queues.

Step S106. Receive, by using the processing thread, a processing result returned by the service server, generate a response according to the processing result, and return the response.

For example, in an application scenario, if a user hopes to view personal data input by the user on a website, the user may initiate a httprequest request by clicking a view button. After receiving the service request, an ingress node encapsulates the service request into a task object, and adds a query parameter included in the service request to an attribute of the task object. A processing thread may read the attribute, and then send the attribute in a preset protocol format to a service server by using a socket connection. The service server may search a database of user data for corresponding personal information such as a nickname, an age, an educational background, and a birthday according to a user identifier of the user in the parameter, and then return the personal information to the ingress node by using a socket connection. The ingress node may generate a httpresponse object including the foregoing information such as the nickname, the age, the educational background, and the birthday, and then return the personal information to the user. The user can view, on a browser, a webpage showing the personal information of the user.

It should be noted that, in this embodiment, during a process in which a processing thread of a ingress node sends a task object to the service server, the processing thread does not need to send the task object to the service server, and may extract only some attribute values in the task object, and then send, based on a customized communications protocol, the attribute values to the service server. The communications protocol may include a task identifier and protocol content for performing corresponding service processing by the service server according to the task identifier. That is, after the processing thread sends a corresponding task identifier to the service server according to the predefined communications protocol, the service server may perform, according to the communications protocol, a specific service operation corresponding to the task identifier.

For example, in an application scenario, a communications protocol (a character string) in a text format is used, a request protocol packet uses a cgi parameter format, fields are separated by "&", "\n" is used as a terminator, a sequence of the fields is unfixed, and a name of a field and a value of the field are separated by "=".

For example, a message sent by a processing thread to a service server may be in a format as follows:

cmd=001001&uin=88883960&area=0\n.

Cmd is a task identifier attribute, and 001001 is a task identifier of a response.

Uin is a user identifier attribute, that is, 88883960; and area is an area identifier, that is, 0. The task identifier may be obtained according to a link address of a service request corresponding to a task object. For example, during developing, each time a developer adds a service, a link address used as a portal needs to be correspondingly provided for the service, a corresponding mapping may be added to a preset table for mapping link addresses to task identifiers, and an ingress node may query the mapping table according to a link address in a service request, to obtain a corresponding task identifier.

Because a & symbol is used as a delimiter of the fields, and cannot be used as content, no extra "&" symbol and "\n" symbol are allowed to occur in content of the character string. When the service server returns a processing result to the ingress node, the foregoing communications protocol may also be complied with, for example:

"cmd=001001&result=0&info= . . . \n".

It should be noted that:

If a parameter value may include a special character (a delimiter of the protocol, for example, "&=%"), a character string is indicated by using % XX (XX is a hex value of the character), which is similar to a parameter input by invoking cgi through a browser. For example, sQQPasswd=%26%25 is used to replace sQQPasswd=&%.

A character conversion rule is as follows:

1. A character in the protocol may be converted into ° A+ a 16 hexadecimal number of an ASCII code of the character, and a letter must be capitalized, for example, a correct converted value of "\n" is % 0D, and other values such as %13 and % 0d are wrong. For a system in which Chinese characters are in the majority, base64 coding may be uniformly used, and all characters are converted into two hexadecimal letters, so as to save space after the coding.

2. Only a character related to the protocol is converted, including: '&', '=', '|', space, '\n', '\r', ':' and all invisible characters.

3. Except the character specified in 2, none of the characters need to be converted.

4. A protocol keyword in the communications protocol.

5. During establishment of the protocol, a parameter is in a form of a list, a parameter name " . . . list" may be used, and a protocol format of a value is that: '|' is used as a first-level delimiter (generally, '|' is also used to separate data of different users), a space or a comma is used as a list of a second-level delimiter (if a problem of two-level separation does not exist in a field, it is suggested to preferentially use a space for separation. In this way, during a future batch query, when a field needs to convey information of multiple users, | may be used for separation), and ~_ or the like may be used as a third-level delimiter (during design, cases of separation on more than three levels are avoided as much as possible). An example is uin1 time1|uin2 time2| . . . |.

In an embodiment, the step of allocating the task object to the processing thread further includes:

splitting the task object into subtask objects, and allocating a corresponding processing thread is allocated for the subtask object.

For example, in an application scenario, a user requests to access a webpage to view score records of the user in multiple games on a game platform, and a display column list in the webpage needs to display score records of the user in 5 different games. Therefore, a task object corresponding to the service request may be split into 5 subtask objects, and each subtask object includes a user identifier of the user. Then the 5 subtask objects are allocated to 5 processing threads, the 5 processing threads may separately send the user identifier in the subtask objects to corresponding service servers, and the service servers can access data servers separately corresponding to the 5 games, query for the score records in databases corresponding to the 5 games in parallel, and then separately return the score records to an ingress node. The ingress node may generate a response after integrating the returned score records of the user in the 5 games, and return the response to the user, and the user may view the score records in a browser. After the task object is split, multiple unrelated processing processes in the task object can be processed concurrently. In the foregoing example, compared with sequential execution of query tasks in 5 data servers, simultaneous execution of query tasks in 5 data servers provides a faster response generating speed, so that the task object in the task queue can be rapidly digested, thereby preventing task congestion.

In this embodiment, the task object may be split according to a link address of the service request corresponding to the task object. In the foregoing example, if a link clicked by the user to view the score records in the multiple games is: http://a.b.c/info?uid=x&gid=all, where http://a.b.c is a host address of the ingress node, /info is a resource path, uid is the user identifier, x and gid are game type identifiers, and all indicates all the 5 games, splitting logic corresponding to /info may be predefined. If gid is g1, a subtask object with a query task identifier being g1 may be generated, for example, cmd=0000301&gid=g1&uid=x . . . .

The subtask object is sent to a processing service server, and the service server queries a g1-type game database for related data according to the parameter; and if gid is g1g2, the task object is split into two subtask objects, and query task identifiers of the subtask objects are g1 and g2, for example:

cmd=0000301&gid=g1&uid=x . . . , and cmd=0000301&gid=g2&uid=x . . . .

After the subtask objects are separately sent to service servers, the service servers access a g1-type game database and a g2-type game database separately according to the query task identifiers, so as to search for related data; and if gid is all, the task object is split into 5 subtask objects, and query task identifiers of the subtask objects are g1, g2, g3, g4, and g5, for example:

cmd=0000301&gid=g1&uid=x . . . ,
cmd=0000301&gid=g2&uid=x . . . ,
cmd=0000301&gid=g3&uid=x . . . ,
cmd=0000301&gid=g4&uid=x . . . , and
cmd=0000301&gid=g5&uid=x . . . .

After the subtask objects are separately sent to service servers, the service servers access a g1-type game database, a g2-type game database, a g3-type game database, a g4-type game database, and a g5-type game database separately according to the query task identifiers, so as to search for related data.

After the predefining of the foregoing splitting logic is completed, when the task object corresponding to the foregoing http://a.b.c/info?uid=x&gid=all is processed, the task object may be split into the subtask objects with the task identifiers separately being g1, g2, g3, g4, and g5.

That is, corresponding splitting logic may be defined in advance for a link address, and when a task object corresponding to the link address is processed, the corresponding splitting logic may be invoked for splitting.

Further, multiple subtask objects after splitting may be allocated to a same processing thread. For example, if a task object is split into 4 subtask objects: A, B, C, and D, A, B, and C are subtasks that can be concurrently executed, and D needs to be executed based on a processing result of A. The subtask object A and the subtask object D may be stored in a form of a queue first, the queue is then allocated to a processing thread, and the processing thread simultaneously executes the subtasks in the queue in sequence: the subtask object A is first extracted from the queue, and after a processing result is obtained, the subtask D is then executed according to the processing result. At the same time, the subtask B and the subtask C are separately allocated to another two processing threads, and can be processed in parallel.

That is, when the splitting logic is defined, a synchronous execution mode, or an asynchronous execution mode, and a sequence in which the subtask objects are executed during synchronous execution may also be defined, so as to conveniently divide a complex task object into multiple subtask objects to be processed in parallel.

In an embodiment, the step of allocating a corresponding processing thread for the subtask object further includes: acquiring a service type of the subtask object, and allocating the processing thread corresponding to the service type of the subtask object for the subtask object.

In a large-scale system, generally, multiple types of services are included, and each type of service corresponds to an independent data server. If in the foregoing example, the data servers of the game g1 to the game g5 have independent game databases, and a certain quantity of processing threads may be separately set in advance for g1 and g5. When the subtask object with a service type being g1 (when a subtask object is generated, a service type of the subtask object can be obtained according to a link address or parameter information in a link address) is allocated, the subtask object with a service type being g1 may be allocated to a processing thread corresponding to the g1 type, and when the subtask object with a service type being g2 is allocated, the subtask object with a service type being g2 may be allocated to a processing thread corresponding to the g2 type.

Processing thread communication is easier than process communication. Therefore, when processing threads of a same type process subtask objects of a same service type, data such as statistical data and log data can be conveniently shared, so that the processing threads are conveniently managed according to a specific service.

In another embodiment, the step of selecting, by the processing thread, a service server includes: acquiring, by the processing thread, a service type of the allocated subtask object, and selecting a service server corresponding to the service type.

That is, service servers, for example, the service servers separately corresponding to the data servers of the game g1 to the game g5 in the foregoing example, may also be classified in advance according to different service types. However, a subtask object may be allocated to any processing thread, and the processing thread selects a corresponding service server according to a service type for processing. In the embodiment, logic for selecting a service server is in a processing thread, so that a coupling degree of modules in a system is reduced, and extensibility is improved.

Figure 4:
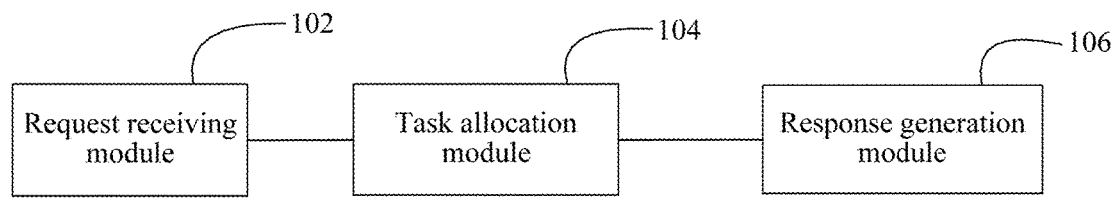
FIG. 4 is a schematic structural diagram of an apparatus for scheduling a concurrent task in an embodiment.

In an embodiment, as shown in FIG. 4, an apparatus for scheduling a concurrent task includes a request receiving module 102, a task allocation module 104, and a response generation module 106.

An apparatus for scheduling a concurrent task includes:

a request receiving module 102, configured to receive an uploaded service request, and encapsulate the service request into a task object;

a task allocation module 104, configured to acquire a processing thread, and allocate the task object to the processing thread, so that the processing thread selects a service server and sends the task object to the selected service server for processing; and a response generation module 106, configured to receive, by using the processing thread, a processing result returned by the service server, generate a response according to the processing result, and return the response.

In this embodiment, the request receiving module 102 is further configured to buffer the task object, which is obtained through encapsulation, in a preset task queue according to a sequence in which the service request is received. The task allocation module 104 is further configured to extract, in a first-in-first-out mode, the task object from the task queue.

In this embodiment, the task allocation module 104 is further configured to split the task object into subtask objects, and allocate a corresponding processing thread for the subtask object.

In an embodiment, the task allocation module 104 is further configured to acquire a service type of the subtask object, and allocate the processing thread corresponding to the service type of the subtask object for the subtask object.

In an embodiment, the task allocation module 104 is further configured so that the processing thread acquires a service type of the allocated subtask object and selects a service server corresponding to the service type.

Figure 5:
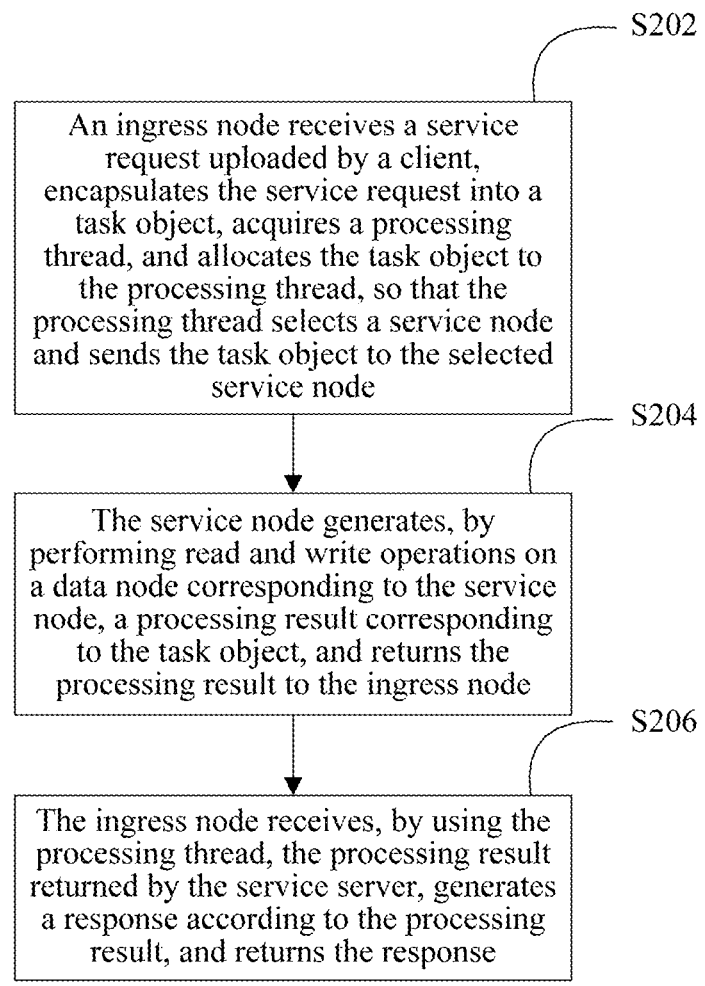
FIG. 5 is a flowchart of a method for scheduling a concurrent task in another embodiment.

In an embodiment, as shown in FIG. 5, a method for scheduling a concurrent task includes:

Step S202. An ingress node receives a service request uploaded by a client, encapsulates the service request into a task object, acquires a processing thread, and allocates the task object to the processing thread, so that the processing thread selects a service node and sends the task object to the selected service node.

Step S204. The service node generates, by performing read and write operations on a data node corresponding to the service node, a processing result corresponding to the task object, and returns the processing result to the ingress node.

Step S206. The ingress node receives, by using the processing thread, the processing result returned by the service server, generates a response according to the processing result, and returns the response.

In an embodiment, as shown in FIG. 3, a system for scheduling a concurrent task includes an ingress node 10, a client 20, a service node 30, and a data node 40.

The ingress node 10 is configured to receive a service request uploaded by a client 20, encapsulate the service request into a task object, acquire a processing thread, and allocate the task object to the processing thread, so that the processing thread selects a service node and sends the task object to the selected service node.

The service node 30 is configured to generate, by performing read and write operations on a data node 40 corresponding to the service node, a processing result corresponding to the task object, and return the processing result to the ingress node.

The ingress node 10 is further configured to receive, by using the processing thread, the processing result returned by the service server, generate a response according to the processing result, and return the response.

In the foregoing method, apparatus, and system for scheduling a concurrent task, a service request is concurrently processed by using a thread as a unit, so that when thread scheduling is performed, multiple threads of a same process share a same memory, and can communicate inside the process, that is, multiple threads processing service requests can be scheduled by directly using a thread scheduling method provided by an operating system. In the present disclosure compared with the conventional technology, when adding or deleting a service, a developer does not need to write or modify a great amount of process communication code used for maintenance, thereby reducing maintenance overheads.

Figure 6:
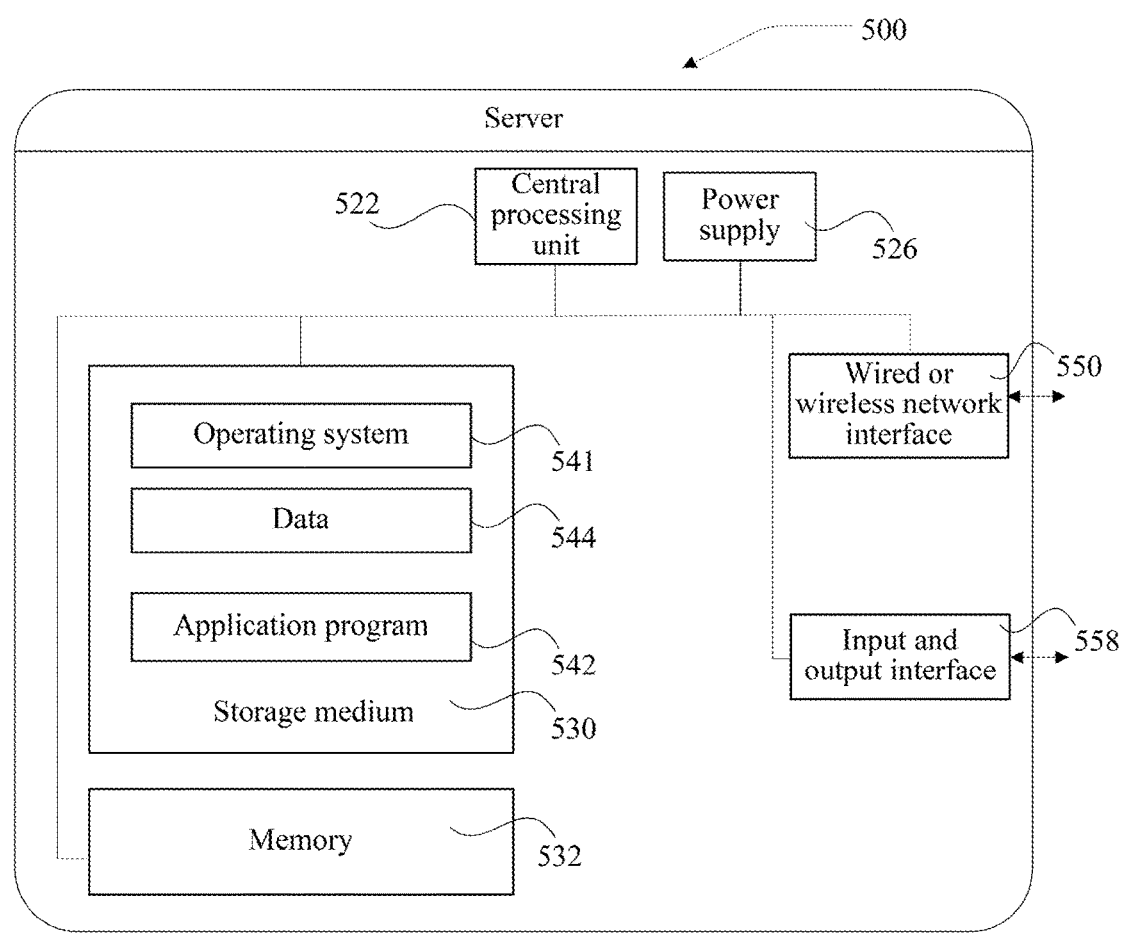
FIG. 6 is a schematic diagram of a running environment of a server that runs a service logic execution method in a web application in an embodiment.

In an embodiment, as shown in FIG. 6, a schematic structural diagram of a server that can run the foregoing method for scheduling a concurrent task is provided, and the server structure may be applied on the ingress node 10 in FIG. 3. The server 500 may vary greatly because of differences in configuration or performance, and may include one or more central processing units (CPU) 522 (for example, one or more processors) and a memory 532, and one or more storage application programs 542 or a storage medium 530 (for example, one or more mass storage devices) of data 544. The memory 532 and the storage medium 530 may be used for transient storage or persistent storage. A program stored in the storage medium 530 may include one or more modules (such as the request receiving module 102, the task allocation module 104, and the response generation module 106 described above), and each module may include a series of instruction operations for the server. Even further, the CPU 522 may be set to be in communication with the storage medium 530, and perform, on the server 500, a series of instruction operations in the storage medium 530. The server 500 may further include one or more power supplies 526, one or more wired or wireless network interfaces 550, one or more input and output interfaces 558, and/or one or more operating systems 541, such as Windows Server™, Mac OS X™, Unix™, Linux™, and FreeBSD™.

The steps performed by the server in the embodiment shown in FIG. 1 may be based on the server structure shown in FIG. 6. A person of ordinary skill in the art may understand that all or some of the procedures in the methods in the foregoing embodiments may be implemented by a program instructing relevant hardware. The program may be stored in a computer readable storage medium. When the program runs, the procedures of the method embodiments are performed. The foregoing storage medium may be: a magnetic disk, an optical disc, a read-only memory (ROM), a random access memory (RAM), or the like.

The foregoing embodiments only describe several implementation manners of the present disclosure, and the description is specific and detailed, but cannot therefore be understood as a limitation on the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for scheduling a concurrent task, performed by an ingress node connected to a plurality of service servers, wherein the method comprises:

receiving an uploaded service request from a client, and encapsulating the service request into a task object, wherein the task object comprises parameters about contents required to be serviced;

splitting the task object into subtask objects with each subtask object comprising a parameter about a content required to be serviced by the subtask object, acquiring a service type of the subtask object, and allocating a processing thread corresponding to the service type of the subtask object for the subtask object, so that the corresponding processing thread selects a service server from the plurality of service servers, forms a converted subtask object in a preset text protocol format by extracting the parameter in the subtask object and sends the converted subtask object to the selected service server for processing, wherein the preset text protocol format comprises a subtask identifier and a protocol content for performing the processing by the selected service server according to the subtask identifier; and receiving, by using each of the processing threads, a processing result returned by the corresponding service server of a corresponding subtask, generating a corresponding response according to the processing results, and returning, by using the ingress node, a response that integrates the responses from the processing threads to the client.

2. The method for scheduling a concurrent task according to claim 1, after the step of encapsulating the service request into a task object, further comprising:

buffering the task object, which is obtained through encapsulation, in a preset task queue according to a sequence in which the service request is received.

3. The method for scheduling a concurrent task according to claim 2, before the step of allocating the task object to the processing thread, further comprising:

extracting, in a first-in-first-out mode, the task object from the task queue.

4. The method for scheduling a concurrent task according to claim 1, wherein the step of selecting, by the processing thread, a service server comprises:

acquiring, by the processing thread, a service type of the allocated subtask object, and selecting a service server corresponding to the service type.

5. An apparatus for scheduling a concurrent task, wherein the apparatus is connected to a plurality of service servers and the apparatus comprises a processor and a software module executed by the processor, and the software module comprises:
- a request receiving module, configured to receive an uploaded service request from a client, and encapsulate the service request into a task object, wherein the task object comprises parameters about contents required to be serviced;
- a task allocation module, configured to split the task object into subtask objects, with each subtask object comprising a parameter about a content required to be serviced by the subtask object, acquire a service type of the subtask object, and allocate a processing thread corresponding to the service type of the subtask object for the subtask object, so that the corresponding processing thread selects a service server from the plurality of service servers, forms a converted subtask object in a preset text protocol format by extracting the parameter in the subtask object and sends the converted subtask object to the selected service server for processing, wherein the preset text protocol format comprises a subtask identifier and a protocol content for performing the processing by the selected service server according to the subtask identifier; and
- a response generation module, configured to receive, by using each of the processing threads, a processing result returned by the corresponding service server of a corresponding subtask, generate, for each of the processing threads, a response according to the processing result of a corresponding processing thread, and return a response that integrates the processing results from the processing threads to the client.

6. The apparatus for scheduling a concurrent task according to claim 5, wherein the request receiving module is further configured to buffer the task object, which is obtained through encapsulation, in a preset task queue according to a sequence in which the service request is received; and the task allocation module is further configured to extract, in a first-in-first-out mode, the task object from the task queue.

7. The apparatus for scheduling a concurrent task according to claim 5, wherein the task allocation module is further configured so that the processing thread acquires a service type of the allocated subtask object and selects a service server corresponding to the service type.

8. A method for scheduling a concurrent task, comprising:
- receiving, by an ingress node connected to a plurality of service servers, a service request uploaded by a client, encapsulating the service request into a task object, wherein the task object comprises parameters about contents required to be serviced,
- splitting the task object into subtask objects with each subtask object comprising a parameter about a content required to be serviced by the subtask object, acquiring a service type of the subtask object, and allocating a processing thread corresponding to the service type of the subtask object for the subtask object, so that the corresponding processing thread selects a service server from the plurality of service servers, forms a converted subtask object in a preset text protocol format by extracting the parameter in the subtask object and sends the converted subtask object to the selected service server for processing, wherein the preset text protocol format comprises a subtask identifier and a protocol content for performing the processing by the selected service server according to the subtask identifier;
- generating, by the service node by performing read and write operations on a data node corresponding to the service node, a processing result corresponding to the task object, and returning the processing result to the ingress node; and receiving, by the ingress node by using each of the processing threads, the processing result returned by the corresponding service server of a corresponding subtask, generating a corresponding response according to the processing results, and returning, by using the ingress node, a response that integrates the responses from the processing threads to the client.

* * * * *